(12) United States Patent
Wallace et al.

(10) Patent No.: US 9,762,611 B2
(45) Date of Patent: Sep. 12, 2017

(54) ENDPOINT-BASED MAN IN THE MIDDLE ATTACK DETECTION USING MACHINE LEARNING MODELS

(71) Applicant: Cylance, Inc., Irvine, CA (US)

(72) Inventors: Brian Michael Wallace, Irvine, CA (US); Xuan Zhao, Irvine, CA (US); Jonathan Wesley Miller, Poway, CA (US)

(73) Assignee: Cylance Inc., Irvine, CA (US)

( * ) Notice: Subject to any disclaimer, the term of this patent is extended or adjusted under 35 U.S.C. 154(b) by 0 days.

(21) Appl. No.: 15/380,896

(22) Filed: Dec. 15, 2016

(65) Prior Publication Data

US 2017/0237773 A1 Aug. 17, 2017

Related U.S. Application Data

(63) Continuation-in-part of application No. 15/045,071, filed on Feb. 16, 2016, now Pat. No. 9,602,531, and a continuation-in-part of application No. 15/283,051, filed on Sep. 30, 2016.

(51) Int. Cl.

| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |
| *H04L 9/06* | (2006.01) |
| *G06N 99/00* | (2010.01) |
| *H04W 12/12* | (2009.01) |

(52) U.S. Cl.
CPC ....... *H04L 63/1466* (2013.01); *G06N 99/005* (2013.01); *H04L 9/0643* (2013.01); *H04L 63/123* (2013.01); *H04L 63/1425* (2013.01); *H04L 63/1433* (2013.01); *H04L 63/1475* (2013.01); *H04W 12/12* (2013.01)

(58) Field of Classification Search
CPC .. H04L 63/14–63/1425; H04L 63/1441; H04L 63/1466; H04L 63/1475; H04W 12/12
See application file for complete search history.

(56) References Cited

U.S. PATENT DOCUMENTS

| | | | | |
|---|---|---|---|---|
| 8,424,091 | B1 * | 4/2013 | Su | H04L 51/12 713/187 |
| 2012/0255027 | A1 * | 10/2012 | Kanakapura | G06F 21/51 726/26 |

(Continued)

*Primary Examiner* — Daniel Potratz
(74) *Attorney, Agent, or Firm* — Jones Day

(57) ABSTRACT

A first node of a networked computing environment initiates each of a plurality of different types of man-in-the middle (MITM) detection tests to determine whether communications between first and second nodes of a computing network are likely to have been subject to an interception or an attempted interception by a third node. Thereafter, it is determined, by the first node, that at least one of the tests indicate that the communications are likely to have been intercepted by a third node. Data is then provided, by the first node, data that characterizes the determination. In some cases, one or more of the MITM detection tests utilizes a machine learning model. Related apparatus, systems, techniques and articles are also described.

30 Claims, 13 Drawing Sheets

(56) References Cited

U.S. PATENT DOCUMENTS

| | | | | |
|---|---|---|---|---|
| 2012/0329426 A1* | 12/2012 | Kario | .................... | H04W 12/12 455/410 |
| 2013/0097710 A1* | 4/2013 | Basavapatna | ........... | H04W 4/02 726/25 |
| 2013/0303159 A1* | 11/2013 | Gathala | .................. | G06N 5/043 455/425 |
| 2014/0359777 A1* | 12/2014 | Lam | ...................... | G06F 21/577 726/25 |
| 2015/0082427 A1* | 3/2015 | Ivanchykhin | ........... | H04L 63/08 726/22 |
| 2016/0227406 A1* | 8/2016 | Waller | ................. | H04L 63/123 |
| 2016/0315963 A1* | 10/2016 | Fiaschi | ................. | H04L 63/123 |

* cited by examiner

ENDPOINT-BASED MAN IN THE MIDDLE ATTACK DETECTION USING MACHINE LEARNING MODELS

RELATED APPLICATIONS

The current patent application claims priority to U.S. patent application Ser. No. 15/045,071, filed on Feb. 16, 2016 and to U.S. patent application Ser. No. 15/283,051, filed on Sep. 30, 2016, the contents of both of which are hereby fully incorporated by reference.

TECHNICAL FIELD

The subject matter described herein relates to the detection of man in the middle attacks within networked computing environments using multiple types of detection tests.

BACKGROUND

Computing environments are becoming increasingly complex as networks exchange data amongst large number of nodes (e.g., clients, mobile computing devices, servers, etc.) via various gateways (e.g., routers, etc.) and using various communications protocols. Such complexity makes such networks susceptible to security breaches and other types of unauthorized access to such communications. One type of unauthorized access is a man in the middle (MITM) attack in which a node or other agent redirects or otherwise intercepts communications between two other nodes within the computing environment. Such MITM attacks can go unnoticed for long periods of time which, in turn, allow the attackers to obtain sensitive and damaging information such as payment credentials and the like.

SUMMARY

In one aspect, a first node of a networked computing environment initiates each of a plurality of different types of man-in-the middle (MITM) detection tests to determine whether communications between first and second nodes of a computing network are likely to have been subject to an interception or an attempted interception by a third node. Thereafter, it is determined, by the first node, that at least one of the tests indicate that the communications are likely to have been intercepted by a third node. Data is then provided, by the first node, data that characterizes the determination. In some variations, at least one of the MITM detection tests can utilize machine learning models when making the underlying determination.

The determining can be based on expected results received by the first node with actual results received by the first node when communicating or attempting to communicate with the second node.

The first node can be a client and the second node can be a server such that the MITM detection tests can be executed at the client.

The first node can be a client and the second node can be a server such that the MITM detection tests can be executed at a fourth node remote from the first, second, and third nodes.

At least one of the MITM detection tests can be a Hypertext Transfer Protocol (HTTP) compression test in which the first node periodically requests that a known file be returned compressed and replies are checked to confirm whether the response includes a compressed version of the known file.

At least one of the MITM detection tests can be an HTTP interception test in which the first node periodically polls the second node and confirms whether a returned status code indicates that there has been a redirect attempt by the third node. As part of the HTTP interception test, the integrity of the underlying data can also be tested in order to determine whether there is an indication of a interception attempt by the third node.

At least one of the MITM detection tests can be an HTTP authentication test in which the first node periodically polls the second node requesting a known file and confirms whether a reply seeking authentication credentials indicates that there has been an interception or an interception attempt by the third node.

At least one of the MITM detection tests can include the first node (i) periodically polling the second node for a static file, (ii) cryptographically hashing the static file, and (iii) comparing the cryptographically hashed static file to a cryptographic hash of a known static file such that any discrepancies between the cryptographic hashes indicates that there has been an interception or an interception attempt by the third node.

At least one of the MITM detection tests can be a communication protocol test in which public keys utilized by cryptographic communications involving the first node are compared to known public keys such that any discrepancies among public keys indicates that there has been an interception or an interception attempt by the third node.

At least one of the MITM detection tests can be a communication protocol test in which a cipher suite utilized by cryptographic communications involving the first node are compared to a known cipher suite such that any discrepancies between cipher suites indicates that there has been an interception or an interception attempt by the third node.

At least one of the MITM detection tests can be an HTTP Strict Transport Security (HSTS) test in which public keys utilized by cryptographic communications involving the first node are compared to known public keys such that any discrepancies among public keys indicates that there has been a an interception or an interception attempt by the third node.

At least one of the MITM detection tests can be a gateway fingerprint test in which unexpected changes for an Internet Protocol (IP) and a media access control (MAC) address for a router intermediate the first node and the second node indicates that there has been an interception or an interception attempt by the third node.

At least one of the MITM detection tests can be a Time to Live (TTY) test in which values in packet traffic received by the first node are monitored to determined if there are any values that indicate that there has been an interception or an interception attempt by the third node.

At least one of the MITM detection tests can be a multicast Domain Name System (mDNS) test in which the first node sends an mDNS request to the second node and if results received by the first node are compared to known Domain Name System (DNS) values such that any discrepancies between such values indicate that there has been an interception or an interception attempt by the third node.

At least one of the MITM detection tests can be an update mechanism test in which the communications between the first node and the second node relate to an update of software on the first node, and executables forming part of the update are periodically compared against known executables such that any discrepancies between such executables indicate that there has been an interception or an interception attempt by the third node.

The first node can, in some variations, be a mobile computing device. In such variations, the first node can be put into an airplane mode upon determination of an occurrence of an interception or an interception attempt.

The first node can, in some variations, be a mobile computing device communicating over a wireless network. In such cases, the first node can send a broadcast to other nodes on the wireless network that indicates that an interception or an interception attempt has occurred on the wireless network.

In some variations, the plurality of different MITM detection tests include at least two (e.g., two, three, four, etc.) tests selected from a group consisting of: (i) a Hypertext Transfer Protocol (HTTP) compression test in which the first node periodically requests that a known file be returned compressed and replies are checked to confirm whether the response includes a compressed version of the known file, (ii) an HTTP interception test in which the first node periodically polls the second node and confirms whether a returned status code indicates that there has been a redirect attempt by the third node, (iii) an HTTP authentication test in which the first node periodically polls the second node requesting a known file and confirms whether a reply seeking authentication credentials indicates that there has been an interception or an interception attempt by the third node, (iv) a test in which the first node (a) periodically polls the second node for a static file, (b) cryptographically hashes the static file, and (c) compares the cryptographically hashed static file to a cryptographic hash of a known static file such that any discrepancies between the cryptographic hashes indicates that there has been an interception or an interception attempt by the third node, (v) a communication protocol test in which public keys utilized by cryptographic communications involving the first node are compared to known public keys such that any discrepancies among public keys indicates that there has been an interception or an interception attempt by the third node, (vi) a communication protocol test in which a cipher suite utilized by cryptographic communications involving the first node are compared to a known cipher suite such that any discrepancies between cipher suites indicates that there has been an interception or an interception attempt by the third node, (vii) an HTTP Strict Transport Security (HSTS) test in which public keys utilized by cryptographic communications involving the first node are compared to known public keys such that any discrepancies among public keys indicates that there has been an interception or an interception attempt by the third node, (viii) a gateway fingerprint test in which unexpected changes for an Internet Protocol (IP) and a media access control (MAC) address for a router intermediate the first node and the second node indicates that there has been an interception or an interception attempt by the third node, (ix) a Time to Live (TTY) test in which values in packet traffic received by the first node are monitored to determined if there are any values that indicate that there has been an interception or an interception attempt by the third node, (x) a multicast Domain Name System (mDNS) test in which the first node sends an mDNS request to the second node and if results received by the first node are compared to known Domain Name System (DNS) values such that any discrepancies between such values indicate that there has been an interception or an interception attempt by the third node, and (xi) an update mechanism test in which the communications between the first node and the second node relate to an update of software on the first node, and executables forming part of the update are periodically compared against known executables such that any discrepancies between such executables indicate that there has been an interception or an interception attempt by the third node.

In another aspect, data is received that includes a plurality of samples that each characterize interception of data traffic to a computing device over a network. Thereafter, the plurality of samples characterizing the interception of data traffic are grouped into a plurality of clusters. At least a portion of the samples are labeled to characterize a likelihood of each such sample as relating to an unauthorized interception of data traffic. Each cluster is assigned with a label corresponding to a majority of samples within such cluster. At least one machine learning model is trained using the assigned labeled clusters such that, once trained, the at least one machine learning model determines a likelihood of future samples as relating to an unauthorized interception of data traffic to a corresponding computing device.

The grouping can include determining a similarity metric for each sample in relation to each other sample such that the clusters are grouped using the determined similarity metrics.

At least one cluster can be divided, using a divisive clustering algorithm, until a threshold number of samples within each cluster has a same label. With such an arrangement, each cluster assigned with a label can include at least one cluster divided using the divisive clustering algorithm.

The samples can encapsulate attributes such as originating IP address of a request, media access control (MAC) addresses for intervening routers, geo-location of a receiving computing device, time of day, frequency of requests, data packet size and frequency, data transfer protocol, whether or not compression was requested, Domain Name System (DNS) values, multicast Domain Name System (mDNS) values, packet payload information, data type of returned information, or whether returned information is a truncated version of expected returned information.

A new sample can be received, in real-time during operation of a second computing device, that characterizes interception of data traffic to the second computing device. It can be then determined, using, the machine learning model, whether the new sample relates to an unauthorized interception of data traffic to the second computing device. Data can be provided that characterizes the determination of whether the new samples relates to an unauthorized interception of data traffic to the second computing device.

The providing data characterizing the determination of whether the new samples relates to an unauthorized interception of data traffic to the second computing can include one or more of: displaying such data in an electronic visual display, transmitting such data to a remote computing system, loading such data into memory, or persisting such data into a physical data storage medium.

The labeling can include presenting, in a graphical user interface, an exemplary sample from each cluster, and receiving, via the graphical user interface (e.g., user input, etc.), a label for the corresponding exemplary sample for each cluster.

In a further interrelated aspect, data received and/or transmitted by a computing device over a network is monitored so that interceptions of such monitored data can be identified. It is determined, using a machine learning model, that at least one of the identified interceptions of the monitored data is unauthorized. Data characterizing the determined at least one unauthorized identified interceptions of the monitored data is then provided. The machine learning model can be trained using assigned label clusters generated by receiving data comprising a plurality of historical samples that each characterize interception of data traffic to a computing device over a network, grouping the plurality of historical samples characterizing into a plurality of clusters, labeling at least a portion of the historical samples to characterize a likelihood of each such sample as relating to an unauthorized interception of data traffic, and assigning each cluster with a label corresponding to a majority of historical samples within such cluster.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. In particular, by using a variety of test methods to detect man in the middle attacks as provided herein, the likelihood of detecting a man in the middle attack before the compromise of unsecured information is drastically increased. Furthermore, by conducting such tests periodically as provided herein, the likelihood is further increased.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
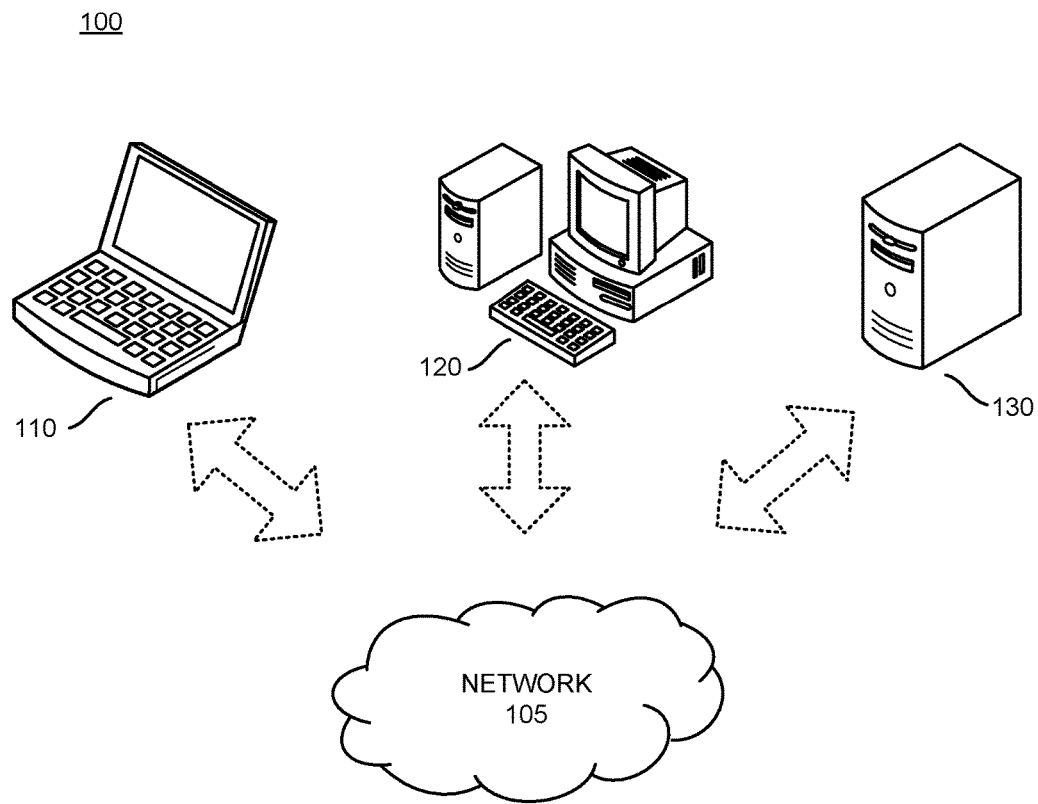
FIG. 1 is a diagram illustrating a computing environment comprising a client, an attacker, and a server.
Figure 2:
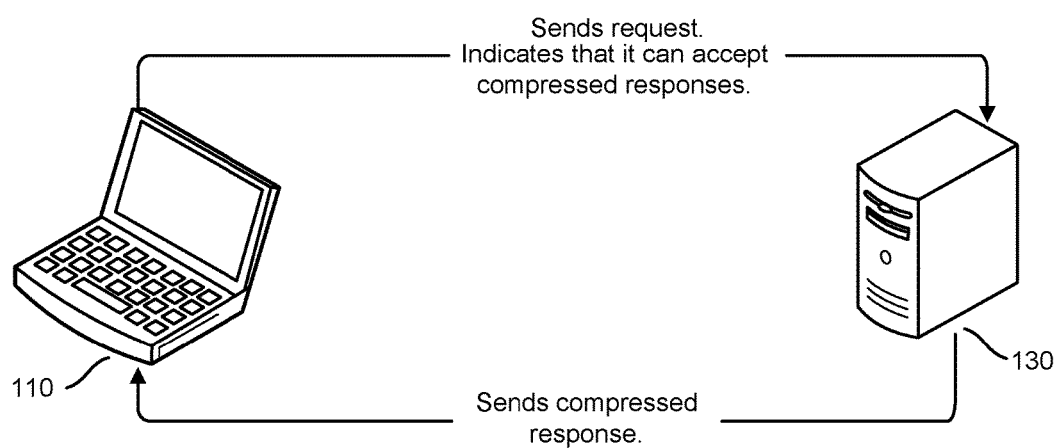
FIG. 2 is a diagram illustrating compression in the HTTP protocol

The current subject matter provides methods, systems, and architectures for detecting man in the middle (MITM) attacks and for taking action to circumvent such attacks or attempted attacks. These attacks can be detected by selectively conducting each of a plurality of different types of MITM detection tests to determine whether or not data communications (e.g., service calls, etc.) between a client (e.g., a computer, computing device, mobile phone, etc.) and a server or other computing device indicates the likelihood of interception and/or diversion of such data communications (i.e., a redirect attempt). In some cases, at least one of the MITM detection tests utilizes a machine learning model (e.g., a classifier engine, etc.).

Each detection test can focus on either detecting a single attack, or on detecting a wide range of attacks by looking for unexpected responses from services which otherwise would supply a predictable result. In some cases, the services queried are servers that are in place specifically to act as predictable servers. In other cases, the services queried will not be controlled (i.e., the servers/nodes are unknown), but are expected to provide reliable results.

By combining these detection tests as provided herein, the likelihood of detecting attacks is highly increased. MITM attacks can be implemented in a wide variety of ways, and testing for them in a variety of ways as provided herein allows for the best coverage. By doing the test combinations on an interval (e.g., a periodic basis, a specific sequence, etc.), the detection of periodic attacks is made more likely.

In many cases, attackers will only be interested in a subset of the victim's data, so they will only launch specific attacks. This means that only by testing for specific and generic attacks, can most man in the middle attacks be detected.

The current subject matter is described in connection with an arrangement involving a client 110, an attacker 120, and a server 130 which can communicate over a network 105. Each of the client 110, attacker 120, and server 130 comprise one or more programmable data processors and memory for storing instructions for executed by such data processor(s). Furthermore, it will be appreciated that each of the client 110, attacker 120, or server 130 can comprise more than one computing device depending on the desired configuration and that the illustrations in FIGS. 1-9 are simplified to aid in the understanding of the current subject matter. In some cases, other intermediate networking components such as a router 140 which provides certain gateways are also illustrated and addressed.

The following describes sample MITM detection tests that can be implemented singly or in combination depending on the desired implementation.

One such test involves HTTP compression. Compression in the HTTP protocol has been a common occurrence for quite some time. With reference to diagram 100 of FIG. 1, the web client 110 which supports compression can request that the server 130 it is communicating with return responses with compression applied. This can be done by adding the following HTTP header to the HTTP request:

Accept-encoding: gzip

In this situation, the server 130 must also support compression. If the remote server 130 does not support compression, it will return the response not compressed. If the response is compressed, the response will contain the following header (as well the data itself will be compressed):

Content-Encoding: gzip

Figure 3:
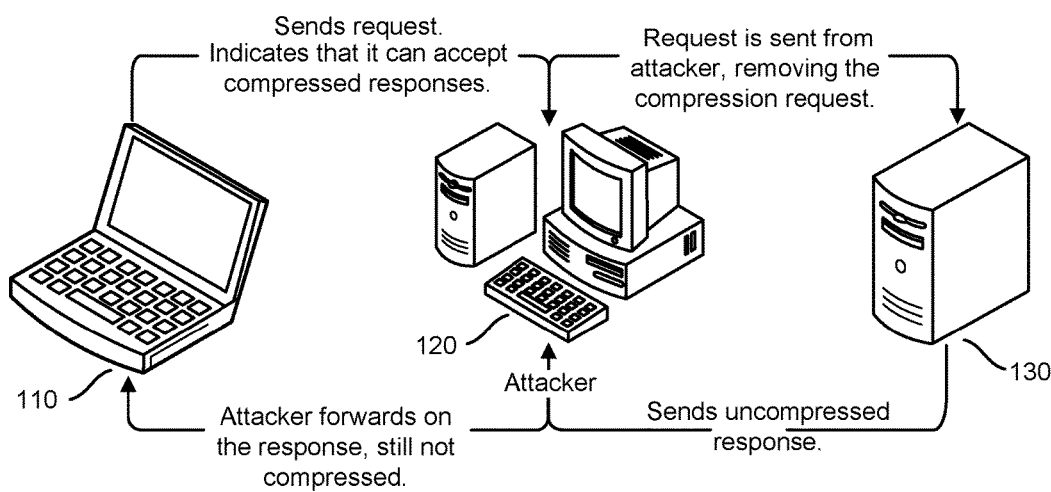
FIG. 3 is a diagram illustrating an MITM attack in connection with compression in the HTTP protocol.

With reference to diagram 300 of FIG. 3, in some cases, the attacker 120 might find it simpler to handle HTTP communication that is not compressed, and can do this simply by manipulating the HTTP communications to not request compressed responses. In particular, the client 110 initially sends a request indicating that it can accept compressed responses. This communication is intercepted by the attacker 120 that then sends a request to the server 130 removing the compression request. The server 130 then sends an uncompressed response to the attacker 120 which then forwards the response (which is not compressed) to the client 110. As the client 110 needs to support non-compressed responses as well, this technique is invisible to the victim (i.e., the client 110).

In order to test for this technique and with reference to again to diagram 300 of FIG. 3, the client 110 can send an HTTP request to a known server 130 which supports HTTP compression. The request sent specifies that the results are compressed. Upon receiving the response, a check is made at the client 110 to confirm that the response was indeed compressed, and that the content received is as expected. If the check indicates that the response was not compressed, then it can be determined that there is a likelihood of an interception or an interception attempt and corrective action can be taken.

The check by this detection test can be done periodically by the client 110, requesting that the server 130 return compressed responses containing a known file. Both the integrity of the file being requested and the compressed state it is expected to be received in are checked. The integrity of the file can be determined in a variety of ways. In one variation, cryptographic hashing mechanisms can be utilized to create a short sequence of bytes which represent the file. By storing the cryptographic hash of the file being downloaded from server 130 in the code of client 110, one can recompute the cryptographic hash and compare. If these string of bytes are equal, then the files are considered to be the same in reference to the cryptographic hashing mechanism. Due to possible ineffectiveness of these cryptographic hashing mechanisms, the size of file to be downloaded from sever 130 can also be stored in the code of server 110. Once the file is downloaded, comparing both the file size and cryptographic hash of the downloaded file with the values stored in the code of client 110, the difficulty level for an attacker to bypass this integrity check is extremely difficult.

HTTP decompression is an option of a public MITM tool named "MITMProxy". In MITMProxy, the flag to enable the HTTP decompression is "-z" or "-anticomp". The purpose of this flag is to make it simpler for an attacker 120, which runs MITMProxy, to analyze the network traffic of the client 110. When MITMProxy on attacker 120 receives an HTTP request (while it is currently launching a man in the middle attack), it checks to see if there is a request for a compressed response by checking for the "Accept-encoding: gzip" header. If it observes this header, it will remove the header in hopes that the remote server 130 will then not return compressed information. To reiterate, the HTTP request from client 110 with the compression header would be intercepted by attacker 120. That header would then be removed by attacker 120 which then forwards the request to server 130. The response from server 130 is handled by attacker 120, which forwards the result to client 110 not compressed.

Figure 4:
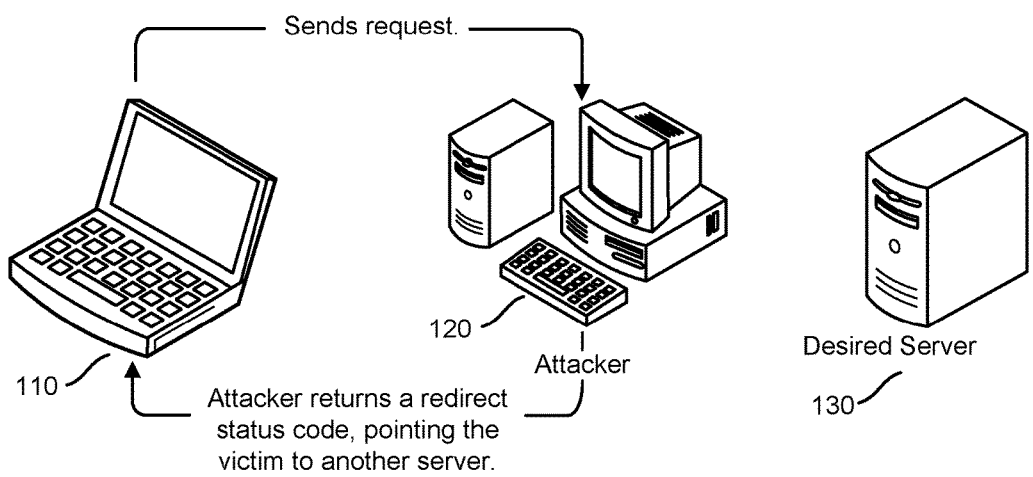
FIG. 4 is a diagram illustrating an MITM attack in connection with HTTP redirection.

With reference to diagram 400 of FIG. 4, another type of test involves HTTP redirection. In the HTTP protocol, there are a number of mechanisms to request that a client 110 search in another location for the resource it is requesting. While this behavior on its own is benign, it can be abused in a variety of ways. Furthermore, if this redirection is requested when it is not expected, it is an indication that the HTTP traffic is being tampered in some way.

With reference again to diagram 400 of FIG. 4, this check can be conducted periodically by requesting a file from a testing HTTP server 130. The HTTP client 110 used to conduct the test checks the HTTP status code of the response in order to determine if there has been an interception or an interception attempt. If the resulting status code is a status code which is indicative of redirection (codes include, for example, 301, 302, 303, 307), a redirection attempt can be reported and/or correction of action can be taken. The integrity of the data requested can also be tested, as some redirection methods may reside in the HTML code being processed, and not at the HTTP protocol level.

The redirect server 120 in association with the redirect to SMB (server message block) vulnerability can conduct this attack. When victims of MITM attacks are forced to connect to the redirect server 120 over HTTP, they are supplied with a HTTP status code which requests they connect to an SMB server (not shown). This attack is done to steal victim credentials. The attack is done by setting the HTTP response status code to 302, and setting the "location" HTTP response header to the attacker's SMB server.

Another type of test involves HTTP authentication. With reference to diagram 500 of FIG. 5, in the HTTP protocol, there are mechanisms to request that the client 110 supply some form of authentication in order to access the requested resource. The attacker 120 will often abuse this functionality in order to trick either the user or their computer to authenticate in a way which would allow for the attacker 120 to obtain the credentials. When requesting a known resource that should not request authentication, if authentication is requested, it is an indication that the HTTP traffic is being tampered in some manner. Again, unauthorized codes can indicate that there is a likelihood of an interception or an interception attempt having occurred so that reporting and/or correction action can take place.

Figure 5:
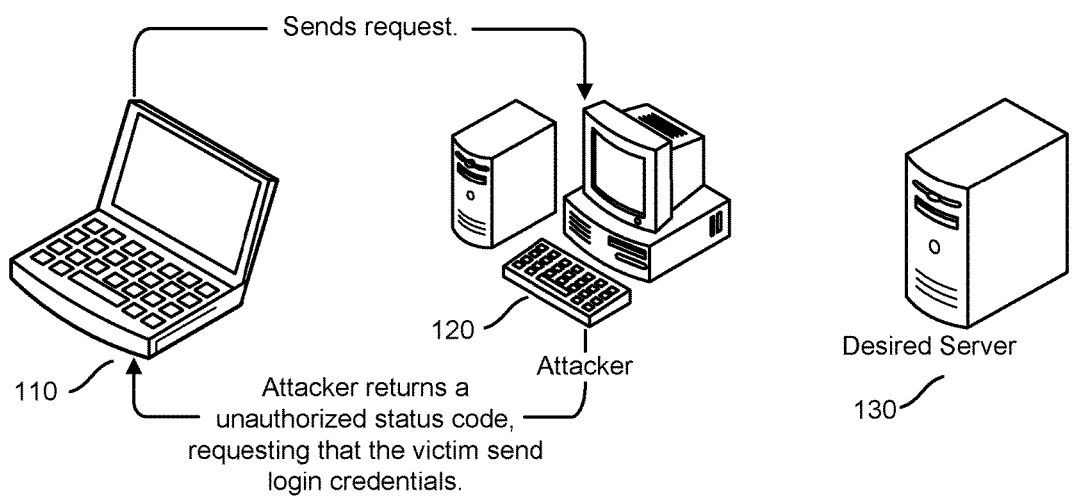
FIG. 5 is a diagram illustrating an MITM attack in connection with HTTP authentication.

With reference to again to diagram 500 of FIG. 5, this check can be conducted by periodically requesting a file from the testing server 130. The HTTP response status code is checked for the forbidden response code (403). If this response code is received by the client 110, the interception or an interception attempt is confirmed. In the absence of the forbidden response, the integrity of the downloaded file is checked for good measure.

Another type of test involves static file transfer. With reference to diagram 600 of FIG. 6, when the client 110 requests a static file over HTTP or another file transfer protocol, if the file contents are known beforehand, the file being downloaded can be compared to the expected file. If an attacker 120 modifies or replaces the contents, the comparison will allow for identification of the modification by the client 110. Any modification indicates tampering. This static file transfer test can be done with most all file types, including but not limited to: WINDOWS Portable Executable (PE), HTML, CSS, JAVASCRIPT, PDF, OFFICE documents, and LINUX Executables (ELF).

Figure 6:
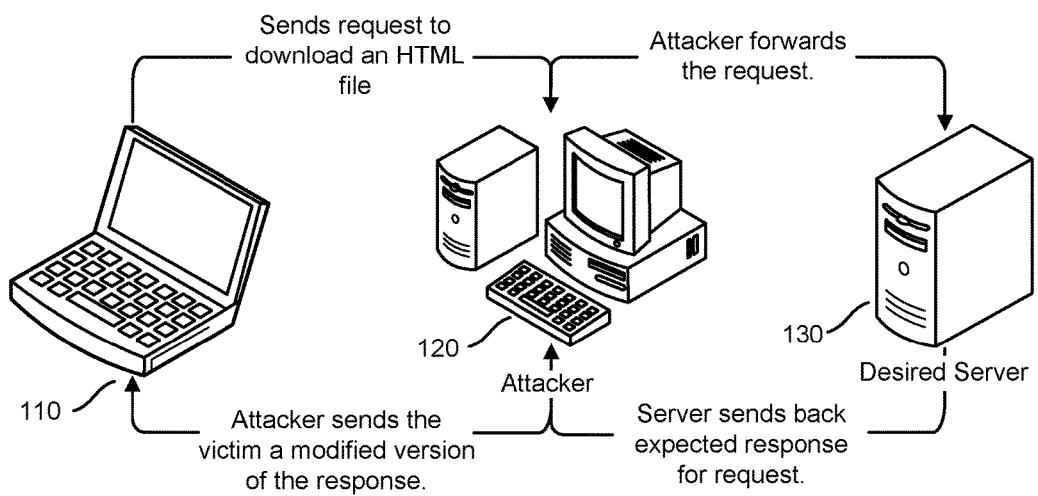
FIG. 6 is a diagram illustrating an MITM attack in connection with static file transfer.

With reference again to diagram 600 of FIG. 6, the check can be simply conducted by preconfiguring an application on the client 110 with cryptographic hashes of the files being requested over HTTP. When the files are downloaded, the files downloaded are additionally cryptographically hashed, and the resulting hashes received by the client 110 (either from the attacker 120 or the server 130 depending on the situation) can be compared with the preconfigured hashes. If there is a discrepancy, the file has been modified and it can be determined that a man in the middle attack is in progress. Multiple cryptographic hashes can be used in order to avoid advanced attacks from bypassing this integrity check.

The Backdoor Factory Proxy (BDFProxy) is a proxy that can be used during man in the middle attacks in order to modify executable files being downloaded from a man in the middle communication channel. When it detects an executable being downloaded, it downloads the executable itself, then runs Backdoor Factory (a tool to infect executables with malicious code), then supplies the modified executable to the victim requesting the original executable. This modified executable would have different cryptographic hashes than those of the expected file, and would result in detection by these checks.

Figure 7:
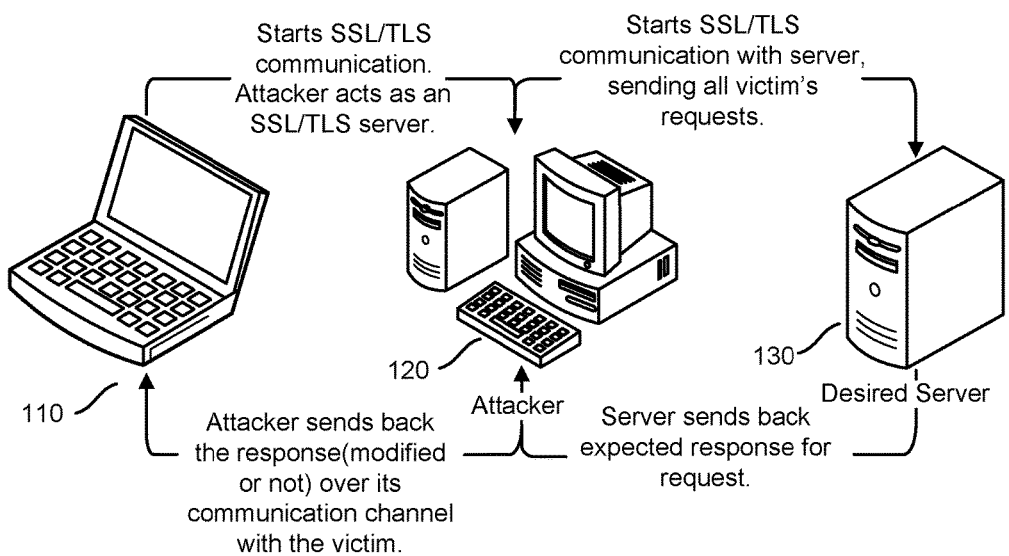
FIG. 7 is a diagram illustrating an MITM attack in connection with secure communication protocols.

Another type of test involves SSL/TLS communication integrity (as illustrated in diagram 700 of FIG. 7). In SSL and TLS, there are mechanisms to confirm the integrity of the communications. By using these cryptographic measures, applications can determine if a third party is manipulating the communication channel. These integrity checks are designed to confirm the data of the SSL/TLS stream itself, but it can also be used as an MITM detection test. In order to do this, a number of SSL/TLS connections out to the remote server 130 by the client 110 can be created which use a public key known to the client 110. When the SSL/TLS connections have been confirmed as valid, it can be further confirmed that the public key used is the one expected (with any discrepancies indicating the likelihood of an interception or an interception attempt).

Many man in the middle attacks on SSL/TLS connections rely on being able to supply a different public key. For instance, one method causes the attacker 120 to act as an SSL/TLS server, decrypt the traffic, tampers] it, and then open up a new SSL/TLS communication channel with the server 120 with which the client 110 wished to communicate. The attacker 120 must have their own public/private key pair in order to act as the server 130, which could not be the same as the expected key pair unless the attackers had mathematical computation ability which is theorized as near to impossible.

Some other attacks on SSL/TLS rely on modifying the accepted cipher suites (the symmetric cryptographic methods used). By additionally ensuring that the cipher suite used for the communication is the expected method, an MITM detection test can further test for man in the middle attacks on these encrypted communication channels. During early communications of the SSL/TLS protocol, the acceptable cipher suites for the client 110 and server 130 can be communicated in plaintext. In some versions of these protocols, an attacker 120 can modify these cipher suites in order to ensure that weak cipher suites are used. The validation process can be done by client 110 expecting a specific list of acceptable cipher suites from server 130, and comparing them to the results from a connection to server 130.

Another testing variation relates to HTTP Strict Transport Security (HSTS) preload testing. HSTS preload is a technology developed to confirm the signers of the SSL/TLS keys of major web sites are as expected. This same method can be implemented as an MITM detection test. HSTS depends on the not the certificate remaining the same, but instead the signing certificate remaining valid. The validation check for this depends on a list correlating internet domains with the certificate signers for these domains. These signing certificates can be confirmed by comparison of key components of the certificate, then basic SSL/TLS signing checks are done for the entire certificate chain.

In addition, in cases in which the device conducting these tests does not change to different networks commonly, there are some methods which can be deployed which can be far more sensitive to changes. These methods would be less effective when changing networks, as an expected baseline for these tests are required. This does not make them unviable for mobile devices, but they are more effective for unchanging networks.

Many man in the middle attacks focus on intercepting network communications with the network gateway in order to obtain information being sent to the internet. If an attacker has managed to convince the device running these tests to route its traffic through the attacker 120, the attacker 120 is then the gateway. It is then likely that there is some difference between the real gateway and the attacker 120. These differences can be identified by periodically fingerprinting the gateway on a variety of aspects.

Figure 8:
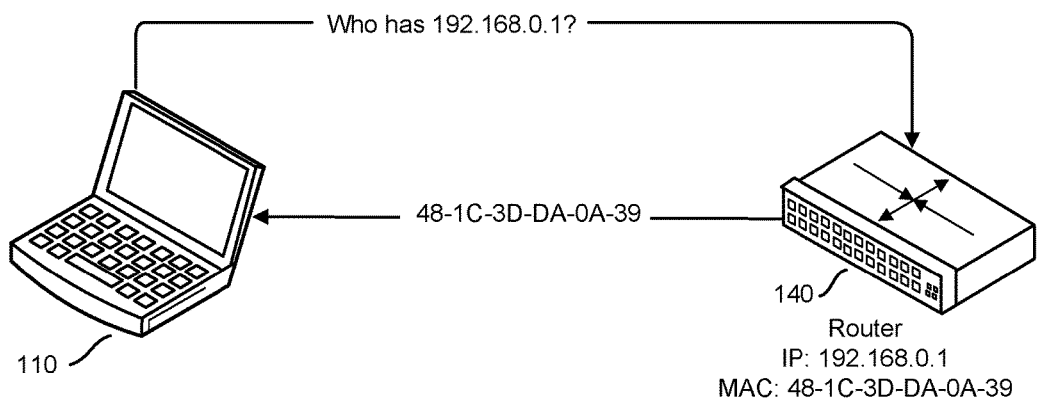
FIG. 8 is a diagram illustrating a client interacting with a router.

With reference to diagram 800 of FIG. 8, for instance, having the client 110 periodically check for the MAC address of the IP address of the gateway could detect ARP Poisoning attacks. If the MAC address for the gateway IP changes, without structural changes to the network by an administrator, the client 110 can determine that it is likely that an attacker 120 is conducting a man in the middle attack.

Figure 9:
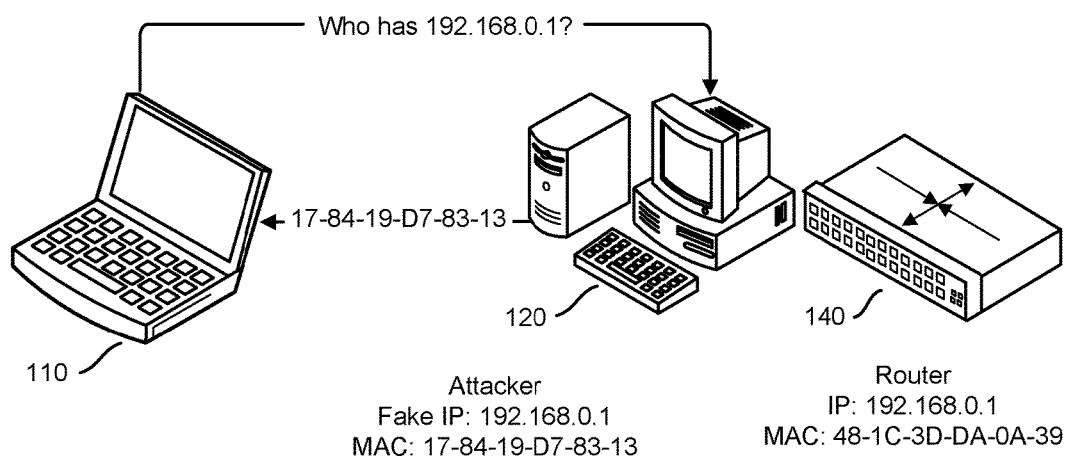
FIG. 9 is a diagram illustrating an MITM attack in connection with a client interacting with a router.

With reference to diagram 900 of FIG. 9, to implement these checks, an administrator must notify the client 110 when their network configuration is considered static in the near future. At this point, the client 110 then gathers both the IP address and MAC address of the network gateway. By storing both these values, the client 110 can determine if either the gateway IP or the gateway MAC address is ever changed, and can alert of any changes being made. The IP address change can be detected by periodically checking the local system's network routing table, and the MAC address can be checked by periodically requesting over ARP for the gateway IP address to be resolved.

There are multiple network protocols which have a field designated as TTY, or Time to Live. This value decrements when the packet is transferred over a routing device (by the routing device itself). While many attackers will not decrement this value, some will. If an expected TTY value is determined, it can be periodically tested for any changes. If any changes occur without an administrator modifying the network, it is likely the result of a man in the middle attack.

The TTY values can be checked by the client 110 conducting what is sometimes referred to as a "traceroute" to the target server 130 when it has a static location. The traceroute method sends IP packets with increasing TTY values (from 0) until the packets reach the target destination (i.e., the server 130). This arrangement allows for identification of the routing devices in-between the client 110 and the target server 130, as when the TTY is exhausted on each packet, the routers 140 (if following protocol) then respond with a packet indicating that the TTY was exhausted. If more or fewer router hops are detected when attempting to reach the target server 130, it is indicative of a modification of the network structure or a man in the middle attack.

Some of the MITM detection tests can detect Address Resolution Protocol (ARP) cache deviations. ARP cache poisoning works by sending out ARP requests or responses which associate another computer's IP address with the MAC address of the attacker 120. This leads to local network traffic to be routed through the attacker 120, allowing for the attacked to control the traffic as they wish. For this attack to be effective, it must override a valid IP address's value in the ARP cache of the client 110. If the ARP cache is regularly monitored for changes on a network which has static assignment of IP addresses, and duplication of MAC to IP address association can indicate ARP cache poisoning. This detection mechanism is a broader application of a Gateway Fingerprinting technique, but requires a less dynamic network.

In order to run these tests, the client 110 only needs to query the local system's ARP table for any changes. While not all ARP table changes indicate an ARP cache poisoning, ARP table changes for certain IP addresses which should remain static are noted. With specific IP addresses on the local network set to alarm when the IP and MAC relationship changes, ARP cache poisoning attacks to specific critical local network resources may be detected. By logging all ARP table changes an administrator can later inspect them in the case that ARP cache poisoning is detected, or any other compromise.

In some cases, man in the middle attack methods themselves can be detected (as opposed to the tampering of data). For example, Domain Name System (DNS) requests often occur directly before connections to the IP addresses supplied by the response to the DNS request. If the attacker 120 is able to modify the results of the DNS request, it can hijack the subsequent connection. The test for such an attack can be based on a number of DNS requests with known results. By comparing the results from the network and the known results, the client can determined there was tampering based on identified discrepancies.

This test is done by making a DNS request for a static DNS entry (one that will not change for the foreseeable future). The client needs to know the expected result for this DNS request in order to compare the result to. If a response is returned that does not match the expected result, a man in the middle attack is likely occurring.

Multicast DNS (mDNS) is a local network DNS protocol. It operates by sending a broadcast to the local network, and waits for responses from any mDNS servers on the local network. The attack on mDNS operates similar to the attack on DNS, supplying false results in order to hijack the resulting connection. In order to detect this attack, an mDNS request to the local network. If any response that conflicts with the known DNS values returns, tampering is detected and appropriate reporting/action can be taken in regard to such interception or interception attempt.

Over the years, there have been many applications known to have vulnerabilities which required or were enhanced with man in the middle capabilities. It stands to reason that an attacker launching a man in the middle attack would be looking for these specific vulnerabilities in order to gain further access to their victims. One example are update mechanisms. In many cases, update mechanisms use both unencrypted and unauthenticated communication channels, allowing for an attacker to simply replace the updated executables with their own malicious application, leading to the victim running the attacker's updater. By both enumerating the known vulnerable update mechanisms and emulating their update checks, attacks can be identified on specific update mechanisms.

The devices most likely to be hit by man in the middle attacks are mobile computing devices (e.g., mobile phones, laptops, tablets, etc.). These devices regularly connect to third party wireless networks, and are almost always on networks provided by wireless carriers. There are various known methods for attackers to take control over both the connection to the wireless carrier and to WiFi networks. Even the most paranoid user has no sure fire way to avoid being the victim of a man in the middle attack short of turning off all communications to and from the device.

By running a persistent service on mobile devices (which act as the client 110) to test for a wide range of man in the middle attacks, these attacks can be detected before information is stolen from the network communications. Upon detection of the man in the middle attack, a variety of actions could be taken. For instance, if the attack is detected on a WiFi network, the network can be disconnected. If the attack is detected over the connection to the wireless carrier, the device can be placed into "airplane mode", disabling communications.

Additionally, if disconnection is not desired, alternative strategies can be used. For instance, a broadcast can be sent by the man in the middle detection application (on the client 110) to other applications to disable any authenticated requests. This can require support by the mobile operating system and from the applications handling authentication. Alternatively, the operating system can be requested to require user authorization with a warning in order to interact with the network.

This functionality is useful for "legitimate" man in the middle situations, where managed third party networks require additional information from the user before being allowed to access the internet. For instance, it is common for WiFi on airplanes to request users to pay before accessing the Internet. It is important for credentials to not be transferred in insecure ways, as these types of networks are prime attack grounds for man in the middle attacks. Users pay less attention to discrepancies and slow connections, attackers easily join the same unencrypted networks, and there are a high number of targets in a small area.

Network guest appliances also pose security risks. If an appliance acts as a potential guest on a publicly accessible network, it can act as an early warning sign that an attacker is attempting to attack other users on the same network. This use case can be deployed by administrators of these publicly accessible networks, or additionally utilized by security conscious guests. The detection of these attacks could lead to the networks to enable more verbose logging mechanisms, allowing for further cooperation with law enforcement, or simply to ban the attacker from using their services in the future.

Moreover, on desktop computers, which rarely change the networks they are on, much more specific detection mechanisms can be used. The detection tests with regard to static networks provided above also directly apply to desktops. When used with desktops, the entire network environment is a canary for man in the middle attacks, and can increase security of the network by reporting back to a central location.

Servers, similar to desktops, are configured in predictable environments. This allows for servers to use the static network mechanisms provided above. Servers tend to be of higher value to organizations, and attackers, than desktop computers. For this reason, increased protections are necessary.

The same functionality used to determine if there is malicious man in the middle attacks can be used to detect that deliberate and benign man in the middle attacks are properly deployed. For instance, if unauthenticated users are restricted from internet access on a network, MITM canary tests can be used to determine if the tests which leave the local network fail. If a test that leaves the local network passes, then it is possible to exfiltrate information. For example, it is common for WiFi on airplanes to restrict internet access to users who pay for access. If running a MITM canary test on the WiFi without purchasing an internet connection, one will see that it is common for DNS query tests to pass, meaning that an internet connection could be established using DNS as a transport method.

If multiple instances of client 110 all report to a central location, a great deal of information on man in the middle attacks could be gathered. With this information, commonly attacked networks can be identified and investigated. Additionally, MITM attacks that affect entire service providers can be quickly identified, and resolved before wide spread infections become an issue would could compromise the stability of the Internet. Gathering such information and potentially warning users of dangerous networks before attacks are launched could allow the users to avoid putting themselves at unneeded risk.

Figure 10:
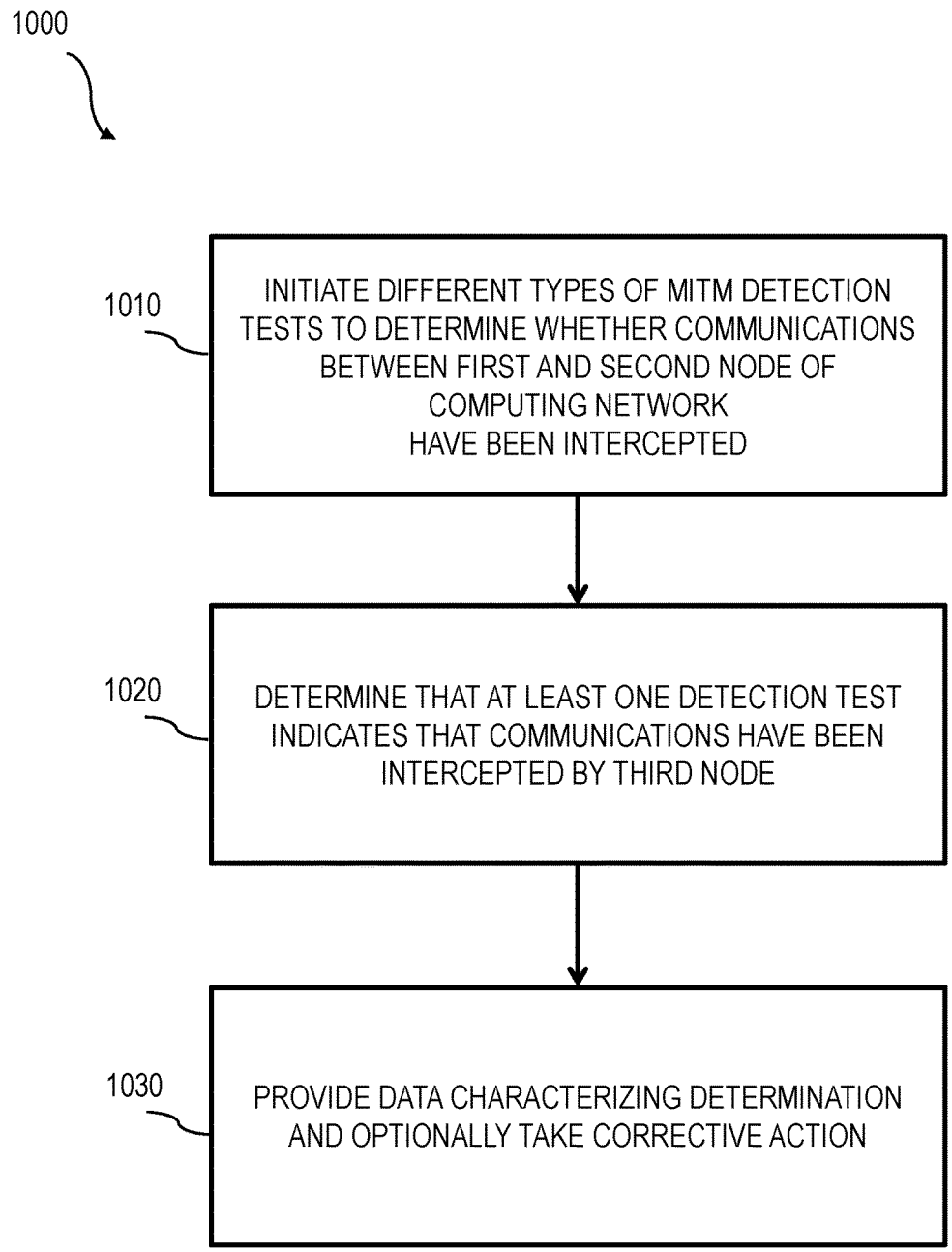
FIG. 10 is a process flow diagram illustrating detection of an MITM attack using a plurality of different types of MITM detection tests.

FIG. 10 is a process flow diagram 1000 in which, at 1010, each of a plurality of different man-in-the middle (MITM) detection tests are initiated (in parallel, in sequence, or a combination of both, etc.) to determine whether communications between first and second nodes of a computing network are likely to have been subject to an interception or an interception attempt by a third node. Thereafter, at 1020, it is determined that at least one of the tests indicate that the communications are likely to have been intercepted by a third node. Such determination can be based, for example, on whether an actual result received by the first node matches an expected result (based, for example, on historical data) from the second node. Subsequently, at 1030, data characterizing the determination can be provided (e.g., displayed, loaded into memory, persisted/stored, transmitted to a remote computing system/node, etc.).

In some cases, one or more of the MITM detection tests can utilize a machine learning model in order to characterize a likelihood of an unauthorized interception of data traffic and/or to make a determination that there was an unauthorized interception of data traffic. These machine learning models can take various forms including, without limitation, unsupervised, semi-supervised, and supervised machine learning models. The machine learning models can, for example, be one or more of: a neural network (e.g., a convolutional neural network, etc.), a logistic regression model, a support vector machine, decision trees, ensembles (bagging, boosting, random forest, etc.), k-nearest neighbors, linear regression, naïve Bayes, logistic regression, perceptron as well as other machine learning models.

Figure 11:
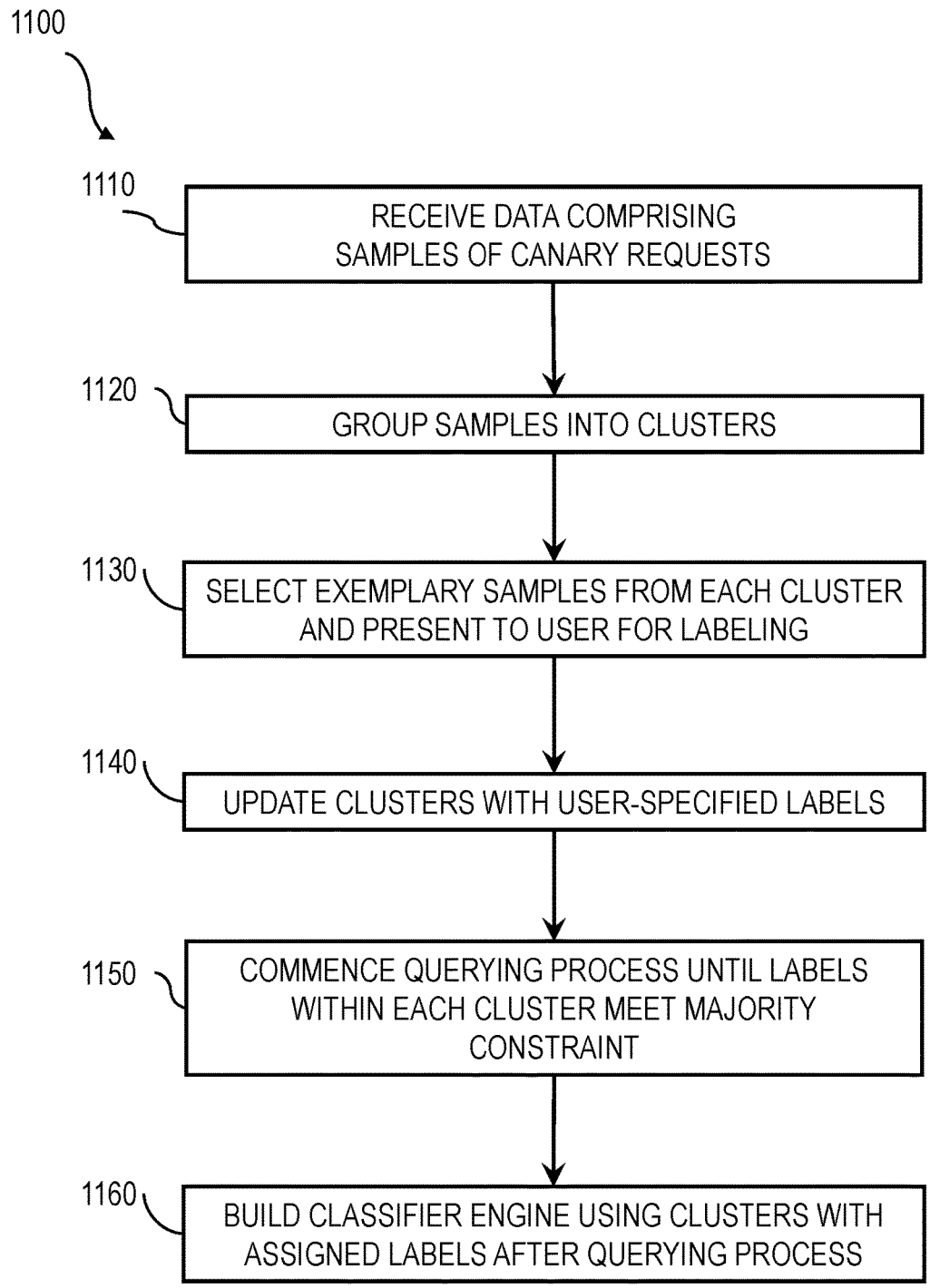
FIG. 11 is a process flow diagram illustrating the building of a classifier engine.

FIG. 11 is a process flow diagram 1100 illustrating active learning as applied to MITM attacks. Initially, at 1110, data is received or otherwise collected that characterizes each of a plurality of canary requests (such data is referred to hereinafter as a "sample") across a plurality of computing nodes (e.g., mobile phones, tablets, laptops and other computing devices) in different environments. Such data can be collected, for example, as provided as described above in connection with any of the different types of tests identified above.

Each sample can include various types of attributes regarding the potential MITM attack including, without limitation: originating IP address of the request, media access control (MAC) addresses for intervening routers, geo-location of the receiving computing device (i.e., location of mobile phone, laptop, tablet, etc.), time of day, frequency of requests, data packet size and frequency, data transfer protocol, whether or not compression was requested, Domain Name System (DNS) values, multicast Domain Name System (mDNS) values, packet payload information, data type of the information returned, whether the returned information is a truncated version of the information expected, and the like. In some variations, the specified attributes are pre-defined while in other variations the specified attributes can be determined as part of a clustering process (based on similarity metrics and the like). With current subject matter, whether the interception of traffic detected through a canary request is truly an attack or not is not known. As a result, at least a portion of the samples are unlabeled (i.e., the ultimate outcome of whether or not an MITM attack occurred and/or an MITM attack was successful is not known). This labeling is omitted on some or all of the samples because labeling can require manual analysis by human beings and can, thus, be costly. The samples can be vectorized into attributes which specify pre-selected aspects of the data in the samples to further facilitate clustering.

Subsequently, at 1120, the samples are grouped to form a plurality of clusters such that, for each cluster, the corresponding samples in such cluster are more similar (based on one or more of the associated attributes in the samples) to each other as compared to samples in other clusters. Such similarity analyses can use, for example, similarity measures/functions to quantify the similarity between each respective sample (i.e., generate similarity metrics, etc.). For example, the similarity measure between two samples can be based on the inverse of the squared Euclidean distance between such samples. Using the similarity metrics, various types of clustering techniques can be used singly, or in combination, including, without limitation, hierarchical clustering, centroid-based clustering (e.g., k-means clustering, etc.), distribution-based clustering, density based clustering to form the groups of samples.

Once the clusters have been formed, at 1130, exemplary samples can be selected from each cluster and a user can then be prompted to provide labels for each sample. Such prompting can, for example, be performed via a graphical user interface and/or workflow software package. The labels can indicate a likelihood of the sample pertaining to a MITM attack. The labels, for example, can indicate, likely MITM attack, possible MITM attack, and unlikely MITM attack.

The sample representative of each cluster can, in some variations, be selected randomly; however, such an arrangement is not always efficient because such selections might be for ambiguous or outlier samples. In other variations, a query by committee method can be utilized in which classifications are performed on all the unlabeled samples with different classification models that are trained with the current labeled data. With such an arrangement, the set of the all classification models obtained in this manner can be described as Ø. Then, g1 and g2 can be randomly chosen where g1, g2∈Ø. If the classification results of g1 and g2 on a sample s do not agree (i.e. g1(s)≠g2(s), etc.), then a label can be queried. If the classification results of g1 and g2 agree, then there is no query.

Thereafter, at 1140, the clusters can be updated with the labels specified by the users. For this purpose, a naïve approach can be used to count the percentage of the majority label in a certain cluster, if the percentage is larger than a predefined threshold, e.g. 70%, then the cluster is maintained without change. Otherwise, the cluster can be divided into two following a hierarchical (divisive) clustering algorithm. With such a divisive clustering algorithm, a set of all clusters that satisfy this majority label constraint can be denoted as c. For example, in one cluster, there are 10 labeled samples, if 8 of them are positive labels (i.e., the samples satisfy the majority label constraint), then the label for the cluster is maintained. However, if only 6 of the samples are positive and 4 of the samples are negative (i.e., the samples do not satisfy the majority label constraint), then a divisive clustering can be performed. In other variations, a cost function L can be defined and the sample labels provided by users can be used as restrictions $\Gamma$ to an optimization problem that minimizes L subjective to the restrictions $\Gamma$. In one example, a cost function L can be the sum of squared errors (SSE), (SSE=$\Sigma\_\{i=1\}^{\wedge}kE\_\{p\backslash in\ C\_i\}$ $(p-m\_i)^{\wedge}2$, as shown below)

$$E = \sum_{k=1}^{k} \sum_{p \in C_i} (p = m_i)^2,$$

where k is the number of clusters, $m_i$ is the center point of a cluster, $C_i$ is the set of all the points in cluster i. The restriction $\Gamma$ can be points with different labels shouldn't be in one cluster, so we penalize the case where different labels fall in one cluster. So if a majority label for a cluster is y, the real label for sample j inside the cluster is $y'\_j$, then $\Gamma = \Sigma\_j$ $y\log(y'\_j)$. With Lagrange multiplier, the cost function to minimize becomes:

$$L = SSE + \lambda \Gamma$$

The cluster assignment for minimizing L can then be changed.

If all clusters satisfy the majority label constraint, that is, all clusters satisfy $c \epsilon \xi$, querying can be stopped; otherwise, the querying process can continue as provided above.

If the determination is made to stop querying, at 250, all the samples in one cluster can be assigned its majority label. This fully labeled dataset can then be used, at 260, to build a classifier, which, in turn, can be used to classify new/subsequent samples.

The algorithm of FIG. 11 can also be represented as provided below in Table 1.

TABLE 1

Algorithm 1 Active Learning for MITM

1: procedure ACTIVELEARNING
2:   for i $\in$ {0, 1, . . . , $N_{canaryRequestCollected}$} do
3:     $v_i \leftarrow$ Vectorized(CanaryRequest$_i$)
4:   C $\leftarrow$ clustering({$v_i$})
5:   while !(c $\in \xi$ for $\forall$c $\in$ C) do
6:     for c $\in$ C do
7:       query lable L($v_i$) for $v_i$, $v_i$ is selected from c
8:       C $\leftarrow$ clustering ({$v_i$}) by minimizing cost function L subjective to constraints supplied by the human lables L($v_i$);
9:   for i $\in$ {0, 1, . . . , $N_{canaryRequestCollected}$} do
10:     L($v_i$) $\leftarrow$ majority lable of the cluster c, where $v_i \in$ c
11:   Use {$v_i \Rightarrow$ L($v_i$)} to build classifier for classifying upcoming canary request.

With the algorithms described herein and illustrated in FIG. 11 and also represented in Table 1, a classifier engine can be built, at 1160, to provide an indication of the likelihood of the interception of traffic detected through a canary request is an MITM attack. This classifier engine can be built such that the need to query humans for labels is minimized, thus the labels can be collected in an online manner. Stated differently, once a certain amount of labels are collected, the classifier engine can classify upcoming canary requests as they are received. In some cases, the classifier engine can be further trained using subsequently received canary requests. The classifier engine can also be further trained using canary requests with known outcomes.

The algorithms described herein and illustrated in FIG. 11 and provided in Table 1 can label a first portion of data collected by a user, and the collection can continue until such time that a majority labeling threshold is met for all defined clusters. The unlabeled data will be labeled with the majority label of the cluster it belongs to. Labeled data will still retain the label it has been assigned to. With the labels for all the samples collected this way, such data can be used to train a classifier, which can predict the label for the coming data. The classifier can, for example, be a machine learning model such as a neural network (e.g., a convolutional neural network, etc.), a logistic regression model, a support vector machine, decision trees, ensembles (bagging, boosting, random forest, etc.), k-nearest neighbors, linear regression, naïve Bayes, logistic regression, perceptron as well as other machine learning models trained using historical data from either a single user or a population of users with known outcomes and/or labels.

The training of such models can be such that a first subset of the data (e.g. 70%) can be used for training, a second subset of the data (e.g. 30%) can be used for testing, a loss function can be defined, and a relationship between the output label and the input data can be determined. The parameters in this relationship will be gradually updated in order to minimize the loss calculated from the loss function.

Figure 12:
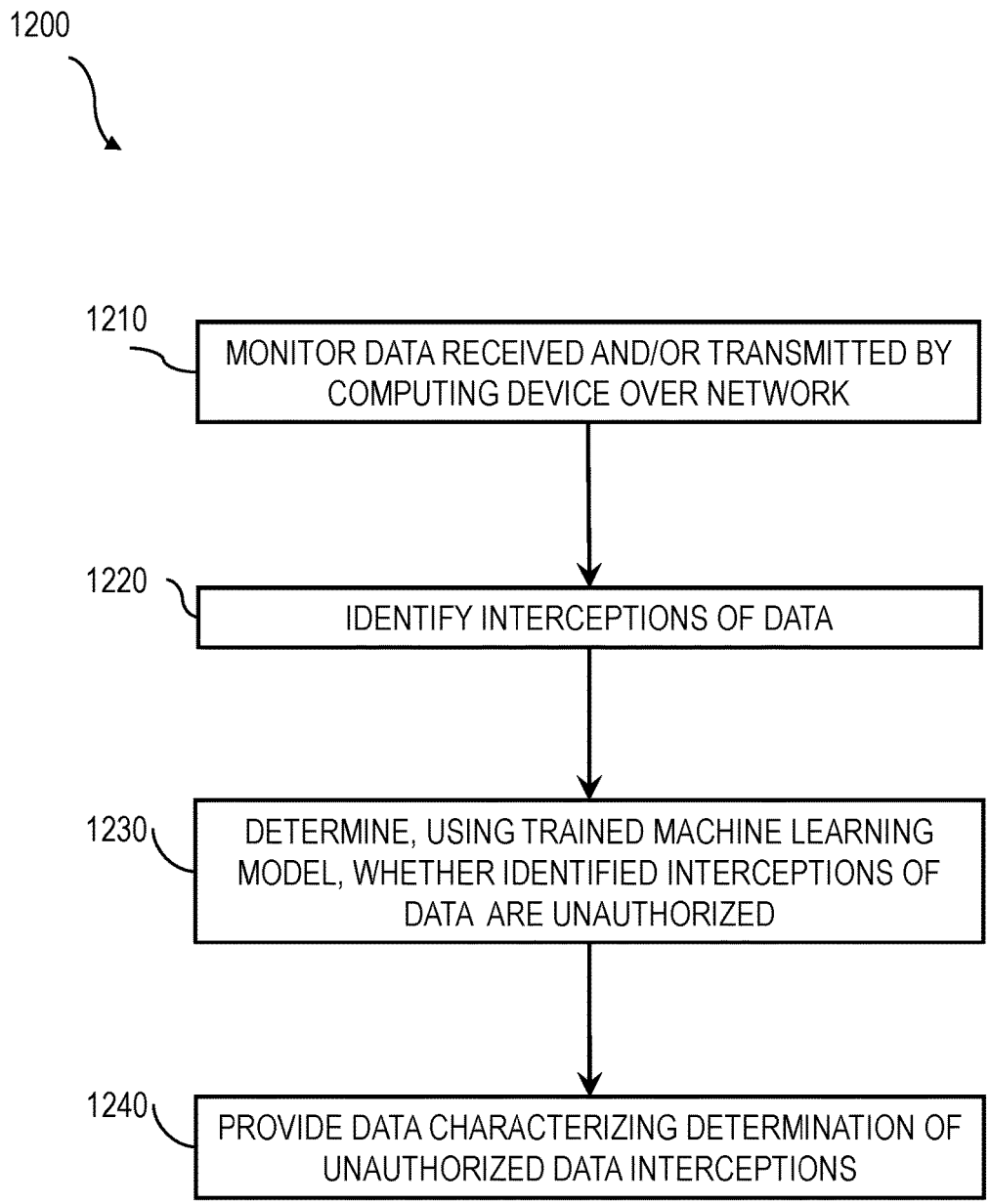
FIG. 12 is a process flow diagram illustrating use of a classifier engine such as that illustrated in FIG. 11.

FIG. 12 is a process flow diagram 300 illustrating runtime aspects of the current subject matter in which, at 310, data received and/or transmitted by a computing device over a network is monitored using a plurality of MITM detection tests. Based on such monitoring, at 320, interceptions of the monitored data are identified. It is later determined, using a machine learning model at 330, that at least one of the identified interceptions of the monitored data is unauthorized (i.e., indicating an MITM attack). Subsequently, at 340, data characterizing the determined at least one unauthorized identified interceptions of the monitored data can optionally be provided (e.g., displayed, loaded, stored, transmitted, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Figure 13:
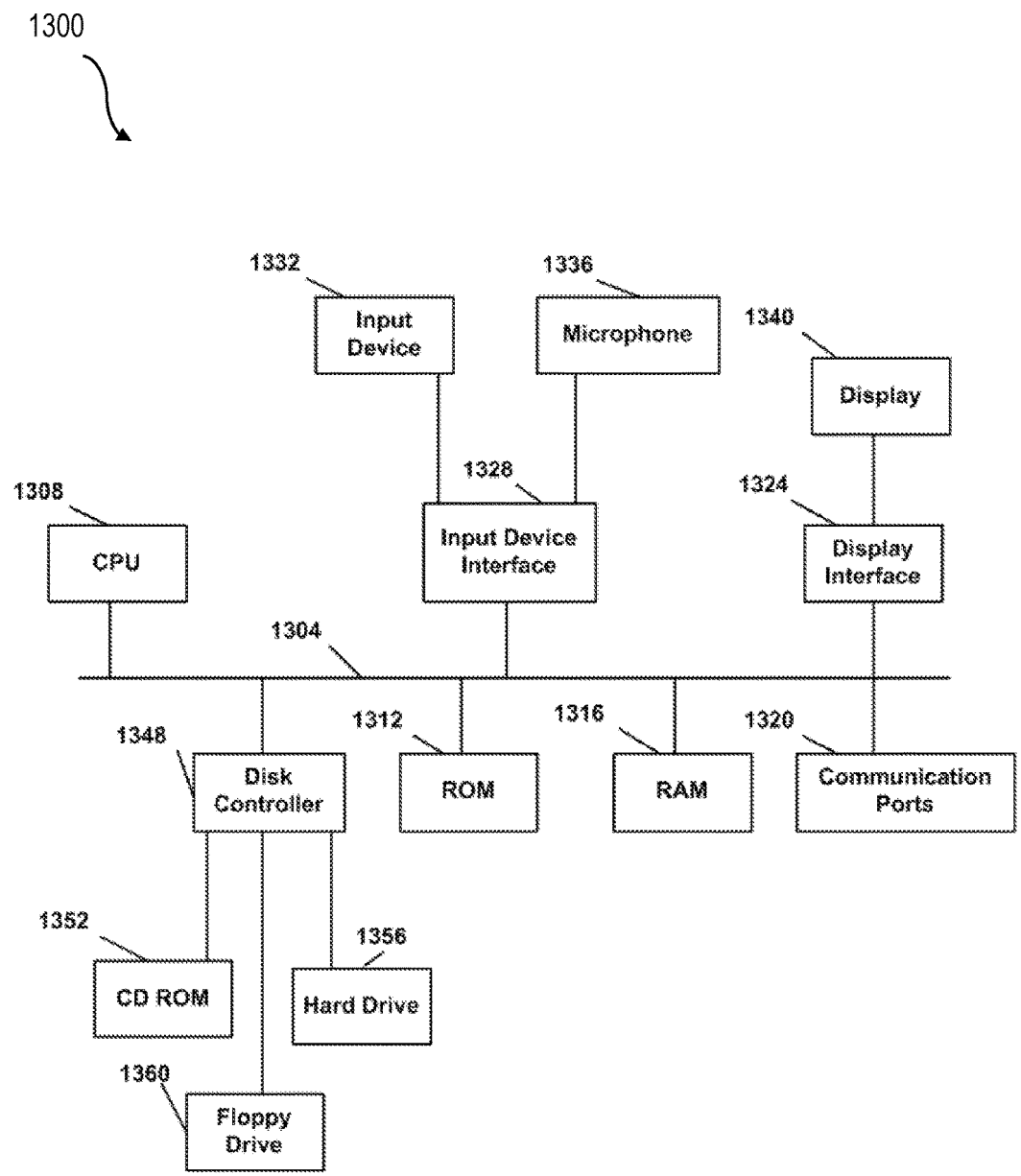
FIG. 13 is a logical diagram showing a computing device for implementing aspects described herein.

FIG. 13 is a diagram illustrating a sample computing device architecture for implementing various aspects described herein. A bus 1304 can serve as the information highway interconnecting the other illustrated components of the hardware. A processing system 1308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1312 and random access memory (RAM) 1314, can be in communication with the processing system 1308 and may include one or more programming instructions for the operations specified here. Optionally, program instructions may be stored on a non-transitory computer-readable storage medium such as a magnetic disk, optical disk, recordable memory device, flash memory, or other physical storage medium.

In one example, a disk controller 1348 can interface one or more optional disk drives to the system bus 1304. These disk drives may be external or internal floppy disk drives such as 1360, external or internal CD-ROM, CD-R, CD-RW or DVD, or solid state drives such as 1352, or external or internal hard drives 1356. As indicated previously, these various disk drives 1352, 1356, 1360 and disk controllers are optional devices. The system bus 1304 can also include at least one communication port 1320 to allow for communication with external devices either physically connected to the computing system or available externally through a wired or wireless network. In some cases, the communication port 1320 includes or otherwise comprises a network interface.

To provide for interaction with a user, the subject matter described herein can be implemented on a computing device having a display device 1340 (e.g., a CRT (cathode ray tube) or LCD (liquid crystal display) monitor) for displaying information obtained from the bus 1304 to the user and an input device 1332 such as keyboard and/or a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback by way of a microphone 1336, or tactile feedback); and input from the user may be received in any form, including acoustic, speech, or tactile input. In the input device 1332 and the microphone 1336 can be coupled to and convey information via the bus 1304 by way of an input device interface 1328. Other computing devices, such as dedicated servers, can omit one or more of the display 1340 and display interface 1324, the input device 1332, the microphone 1336, and input device interface 1328.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. A computer-implemented method comprising:
  initiating, by a first node of a networked computing environment, each of a plurality of different types of different man-in-the middle (MITM) detection tests to determine whether communications between first and second nodes of a computing network are likely to have been subject to an interception or an attempted interception by a third node;

determining, by the first node, that at least one of the tests indicate that the communications are likely to have been intercepted by a third node; and providing, by the first node, data characterizing the determination;

wherein at least one of the different types of MITM detection tests utilizes at least one machine learning model trained by:

receiving training data comprising a plurality of samples that each characterize interception of data traffic to a computing device over a network;

grouping the plurality of samples characterizing the interception of data traffic into a plurality of clusters;

labeling at least a portion of the samples to characterize a likelihood of each such sample as relating to an unauthorized interception of data traffic;

assigning each cluster with a label corresponding to a majority of samples within such cluster; and training the at least one machine learning model using the assigned labeled clusters which, once trained, determines a likelihood of future samples as relating to an unauthorized interception of data traffic to a corresponding computing device.

2. The method of claim 1, wherein the different types of MITM detection tests are initiated at pre-defined intervals and according to a specified sequence.

3. The method of claim 1, wherein at least one of the different types of MITM detection tests looks for an unexpected response received from a service that would otherwise respond with an expected response.

4. The method of claim 1, wherein the first node is a client and the second node is a server, and the MITM detection tests are executed at the client.

5. The method of claim 1, wherein the first node is a client and the second node is a server, and the MITM detection tests are executed at a fourth node remote from the first, second, and third nodes.

6. The method of claim 1, wherein at least one of the different types of MITM detection tests is a Hypertext Transfer Protocol (HTTP) compression test in which the first node periodically requests that a known file be returned compressed and replies are checked to confirm whether the response includes a compressed version of the known file.

7. The method of claim 6, wherein the compressed version of the known file has an expected integrity and compression state, and wherein the expected integrity of the compressed version of the file is determined by (i) comparing a hash of the received compressed version of the file with a stored hash of the known file and (ii) comparing a file size of the received compressed version of the file with a stored file size of a compressed version of the known file.

8. The method of claim 1, wherein at least one of the different types of MITM detection tests is an HTTP interception test in which the first node periodically polls the second node and confirms whether a returned status code indicates that there has been a redirect attempt by the third node.

9. The method of claim 8, wherein as part of the HTTP interception test the integrity of the underlying data is also tested in order to determine whether there is an indication of a interception attempt by the third node.

10. The method of claim 1, wherein at least one of the different types of MITM detection tests is an HTTP authentication test in which the first node periodically polls the second node requesting a known file and confirms whether a reply seeking authentication credentials indicates that there has been an interception or an interception attempt by the third node.

11. The method of claim 1, wherein at least one of the different types of MITM detection tests includes the first node (i) periodically polling the second node for a static file, (ii) cryptographically hashing the static file, and (iii) comparing the cryptographically hashed static file to a cryptographic hash of a known static file such that any discrepancies between the cryptographic hashes indicates that there has been an interception or an interception attempt by the third node.

12. The method of claim 1, wherein at least one of the different types of MITM detection tests is a communication protocol test in which public keys utilized by cryptographic communications involving the first node are compared to known public keys such that any discrepancies among public keys indicates that there has been an interception or an interception attempt by the third node.

13. The method of claim 1, wherein at least one of the different types of MITM detection tests is a communication protocol test in which a cipher suite utilized by cryptographic communications involving the first node are compared to a known cipher suite such that any discrepancies between cipher suites indicates that there has been an interception or an interception attempt by the third node.

14. The method of claim 1, wherein at least one of the different types of MITM detection tests is an HTTP Strict Transport Security (HSTS) test in which public keys utilized by cryptographic communications involving the first node are compared to known public keys such that any discrepancies among public keys indicates that there has been an interception or an interception attempt by the third node.

15. The method of claim 1, wherein at least one of the different types of MITM detection tests is a gateway fingerprint test in which unexpected changes for an Internet Protocol (IP) and a media access control (MAC) address for a router intermediate the first node and the second node indicates that there has been an interception or an interception attempt by the third node.

16. The method of claim 1, wherein at least one of the different types of MITM detection tests is a Time to Live (TTY) test in which values in packet traffic received by the first node are monitored to determined if there are any values that indicate that there has been an interception or an interception attempt by the third node.

17. The method of claim 1, wherein at least one of the different types of MITM detection tests is a multicast Domain Name System (mDNS) test in which the first node sends an mDNS request to the second node and if results received by the first node are compared to known Domain Name System (DNS) values such that any discrepancies between such values indicate that there has been an interception or an interception attempt by the third node.

18. The method of claim 1, wherein at least one of the different types of MITM detection tests is an update mechanism test in which the communications between the first node and the second node relate to an update of software on the first node, and executables forming part of the update are periodically compared against known executables such that any discrepancies between such executables indicate that there has been an interception or an interception attempt by the third node.

19. The method of claim 1, wherein the first node is a mobile computing device and the method further comprises:

placing the first node into an airplane mode upon determination of an occurrence of an interception or an interception attempt.

20. The method of claim 1, wherein the first node is a mobile computing device communicating over a wireless network and the method further comprises:
sending, by the first node, a broadcast to other nodes on the wireless network indicating that an interception or an interception attempt has occurred on the wireless network.

21. The method of claim 1, wherein providing data comprises at least one of: displaying the data, loading the data into memory, storing the data, or transmitting the data to a remote computing system.

22. The method of claim 1, wherein the plurality of different MITM detection tests comprises at least two tests selected from a group consisting of:
(i) a Hypertext Transfer Protocol (HTTP) compression test in which the first node periodically requests that a known file be returned compressed and replies are checked to confirm whether the response includes a compressed version of the known file,
(ii) an HTTP interception test in which the first node periodically polls the second node and confirms whether a returned status code indicates that there has been a redirect attempt by the third node,
(iii) an HTTP authentication test in which the first node periodically polls the second node requesting a known file and confirms whether a reply seeking authentication credentials indicates that there has been an interception or an interception attempt by the third node,
(iv) a test in which the first node (a) periodically polls the second node for a static file, (b) cryptographically hashes the static file, and (c) compares the cryptographically hashed static file to a cryptographic hash of a known static file such that any discrepancies between the cryptographic hashes indicates that there has been an interception or an interception attempt by the third node,
(v) a communication protocol test in which public keys utilized by cryptographic communications involving the first node are compared to known public keys such that any discrepancies among public keys indicates that there has been an interception or an interception attempt by the third node,
(vi) a communication protocol test in which a cipher suite utilized by cryptographic communications involving the first node are compared to a known cipher suite such that any discrepancies between cipher suites indicates that there has been an interception or an interception attempt by the third node,
(vii) an HTTP Strict Transport Security (HSTS) test in which public keys utilized by cryptographic communications involving the first node are compared to known public keys such that any discrepancies among public keys indicates that there has been a an interception or an interception attempt by the third node,
(viii) a gateway fingerprint test in which unexpected changes for an Internet Protocol (IP) and a media access control (MAC) address for a router intermediate the first node and the second node indicates that there has been an interception or an interception attempt by the third node,
(ix) a Time to Live (TTY) test in which values in packet traffic received by the first node are monitored to determined if there are any values that indicate that there has been an interception or an interception attempt by the third node,
(x) a multicast Domain Name System (mDNS) test in which the first node sends an mDNS request to the second node and if results received by the first node are compared to known Domain Name System (DNS) values such that any discrepancies between such values indicate that there has been an interception or an interception attempt by the third node, and
(xi) an update mechanism test in which the communications between the first node and the second node relate to an update of software on the first node, and executables forming part of the update are periodically compared against known executables such that any discrepancies between such executables indicate that there has been an interception or an interception attempt by the third node.

23. The method of claim 1, wherein the at least one machine learning model utilizes one or more of: a neural network, a logistic regression model, a support vector machine, decision trees, a bagging ensemble, a boosting ensemble, a random forest ensemble, k-nearest neighbors, linear regression, naïve Bayes, logistic regression, or a perceptron.

24. The method of claim 1 further comprising:
receiving the training data;
grouping the plurality of samples characterizing the interception of data traffic into the plurality of clusters;
labeling at least a portion of the samples to characterize the likelihood of each such sample as relating to an unauthorized interception of data traffic;
assigning each cluster with the label corresponding to the majority of samples within such cluster; and
training the at least one machine learning model using the assigned labeled clusters which, once trained, determines the likelihood of future samples as relating to an unauthorized interception of data traffic to a corresponding computing device.

25. The method of claim 24, wherein the grouping comprises:
determining a similarity metric for each sample in relation to each other sample;
wherein the clusters are grouped using the determined similarity metrics.

26. The method of claim 24 further comprising:
dividing, using a divisive clustering algorithm, at least one cluster until a threshold number of samples within each cluster has a same label;
wherein each cluster assigned with a label includes at least one cluster divided using the divisive clustering algorithm.

27. The method of claim 24, wherein the samples encapsulate attributes selected from a group consisting of: originating IP address of a request, media access control (MAC) addresses for intervening routers, geo-location of a receiving computing device, time of day, frequency of requests, data packet size and frequency, data transfer protocol, whether or not compression was requested, Domain Name System (DNS) values, multicast Domain Name System (mDNS) values, packet payload information, data type of returned information, or whether returned information is a truncated version of expected returned information.

28. The method of claim 24 further comprising:
receiving, in real-time during operation of a second computing device, a new sample characterizing interception of data traffic to the second computing device;

determining, using, the machine learning model, whether the new sample relates to an unauthorized interception of data traffic to the second computing device; and providing data characterizing the determination of whether the new samples relates to an unauthorized interception of data traffic to the second computing device.

29. The method of claim 28, wherein the providing data characterizing the determination of whether the new samples relates to an unauthorized interception of data traffic to the second computing device comprises at least one of: displaying such data in an electronic visual display, transmitting such data to a remote computing system, loading such data into memory, or persisting such data into a physical data storage medium.

30. The method of claim 29, wherein the labeling comprises:

presenting, in a graphical user interface, an exemplary sample from each cluster; and receiving, via the graphical user interface, a label for the corresponding exemplary sample for each cluster.

* * * * *